US011076583B2

(12) United States Patent
Short

(10) Patent No.: US 11,076,583 B2
(45) Date of Patent: Aug. 3, 2021

(54) CATCHER BASKET ASSEMBLY

(71) Applicant: Mark Stephen Short, Cape Cleveland (AU)

(72) Inventor: Mark Stephen Short, Cape Cleveland (AU)

(*) Notice: Subject to any disclaimer, the term of this patent is extended or adjusted under 35 U.S.C. 154(b) by 147 days.

(21) Appl. No.: 16/304,613

(22) PCT Filed: May 31, 2017

(86) PCT No.: PCT/AU2017/050521
§ 371 (c)(1),
(2) Date: Nov. 26, 2018

(87) PCT Pub. No.: WO2017/205920
PCT Pub. Date: Dec. 7, 2017

(65) Prior Publication Data
US 2020/0178507 A1    Jun. 11, 2020

(30) Foreign Application Priority Data
May 31, 2016 (AU) ................. 2016902076

(51) Int. Cl.
*A01K 63/02* (2006.01)
*A01K 1/02* (2006.01)
(Continued)

(52) U.S. Cl.
CPC ............ *A01K 63/02* (2013.01); *A01K 1/0245* (2013.01); *A01K 61/90* (2017.01); *B60P 3/04* (2013.01);
(Continued)

(58) Field of Classification Search
CPC ....... A01K 1/0245; A01K 61/90; A01K 63/02
See application file for complete search history.

(56) References Cited

U.S. PATENT DOCUMENTS 4,148,427 A    4/1979 Baker
5,031,573 A * 7/1991 De Marco ............ A01K 1/0245
                                                        119/496
(Continued)

FOREIGN PATENT DOCUMENTS

AU    2015213390 B1    3/2016
CA    2893010 A1 *    6/2014    ............. A01K 63/02
(Continued)

OTHER PUBLICATIONS

International Preliminary Report on Patentability in corresponding PCT application No. PCT/AU2017/050521, dated Dec. 4, 2018, 8 pp.

(Continued)

*Primary Examiner* — Monica L Barlow
*Assistant Examiner* — Aaron M Rodziwicz
(74) *Attorney, Agent, or Firm* — Tredecim LLC; Sean L. Sweeney

(57) ABSTRACT

The invention relates to a catcher basket assembly including a main body, at least one confining container for containing an animal, and at least one directing part in the main body, for assisting to direct the animal from the main body to the confining container. In use, the directing part directs an animal towards one or more confining container and the confining container enables the animal to be visually inspected and sorted without the need to make direct contact with the animal. The invention also relates to a catcher basket assembly for confining and sorting a crab. The invention also relates to a method of use of a catcher basket assembly.

19 Claims, 9 Drawing Sheets

(51) Int. Cl.
 *A01K 61/90* (2017.01)
 *B60P 3/04* (2006.01)
(52) U.S. Cl.
 CPC .. *F25D 2303/082* (2013.01); *F25D 2331/804* (2013.01)

(56) References Cited

U.S. PATENT DOCUMENTS

| | | | |
|---|---|---|---|
| 5,042,260 A | 8/1991 | George, Sr. | |
| 5,133,290 A * | 7/1992 | De Marco | A01K 1/0245 119/497 |
| 5,218,923 A * | 6/1993 | LaRosa | A01K 63/02 119/201 |
| 5,555,845 A * | 9/1996 | Flynn | A01K 63/02 119/201 |
| 6,041,931 A * | 3/2000 | Jacques | A01K 63/02 119/214 |
| 7,523,716 B2 * | 4/2009 | Vadis | A01K 63/003 119/6.5 |
| 2003/0136350 A1 | 7/2003 | Giordano et al. | |
| 2007/0227460 A1 | 10/2007 | Lynch | |
| 2016/0050893 A1 * | 2/2016 | Lari | A01K 63/003 119/248 |
| 2019/0297858 A1 * | 10/2019 | Tharp | F25D 3/08 |

FOREIGN PATENT DOCUMENTS

| | | | | |
|---|---|---|---|---|
| CA | 2944984 A1 * | 10/2015 | | A01K 63/02 |
| CA | 2863692 A1 * | 3/2016 | | B65D 43/22 |
| CN | 2037927 | 5/1989 | | |
| CN | 105104245 A | 12/2015 | | |
| FR | 2918971 A1 * | 1/2009 | | A01K 63/02 |
| GB | 2100961 A * | 1/1983 | | A01K 61/59 |
| GB | 2100961 B | 1/1983 | | |
| WO | 1991012712 A1 | 9/1991 | | |
| WO | 2015155480 A1 | 10/2015 | | |
| WO | 2016020579 A1 | 2/2016 | | |

OTHER PUBLICATIONS

International Search Report in corresponding PCT application No. PCT/AU2017/050521, dated Aug. 4, 2017, 6 pp.
Written Opinion in corresponding PCT application No. PCT/AU2017/050521, dated Aug. 4, 2017, 7 pp.
Soft Shell Crab Farming, retrieved from the internet on Jul. 19, 2017, <URL: https://web.archive.org/web/20140816024322/http://www.theseafoodcompany.com.sg/index.php/component/k2/item/22-soft-shell-crab-farming>; published on Aug. 16, 2014 as per Wayback Machine.
Best available translation of item CN105104245, Dec. 2, 2015, to Zhejiang Ocean University, 5 pp. (translation via Google Patents).
Application prosecution documents in corresponding CN application No. 201780033355, Nov. 27, 2020, pp. 8.
Best available translation of item CN2037927, May 24, 1989, to 张淼富, 5 pp. (translation via EPO Patent Translate).

* cited by examiner

CATCHER BASKET ASSEMBLY

FIELD OF THE INVENTION

The present invention relates to a catcher basket assembly for an animal.

BACKGROUND OF THE INVENTION

For both commercial and recreational fishers, handling of crabs, such as mud crabs is a difficult task. The claws are strong and sharp and can cause serious injury to fingers and toes, in particular. Crab meat is a valuable commodity and it is highly desirable to be able to maintain the crab shell intact. Any damage to the shell can lead to degradation of the meat inside, reducing the saleability of the crab. It may be that the crab may not be able to be sold if the shell is visibly damaged.

Another problem, is that if distressed or fighting the crab may throw a claw. Crabs with claws missing are not saleable products as a whole crab, which significantly diminishes the value. Crabs are often kept together, an unnatural state of affairs for these territorial creatures, so they naturally fight for supremacy, causing damage to the shell, claws to be thrown or possibly death, and being eaten by the other crabs. You may start with a good collection of crabs only to find the biggest swiftly dealt with the others overnight, and the number diminished in the morning.

Therefore, there has been a significant problem for a long time of, how do you make it easier to handle crabs without getting hurt, and without causing damage to the crab. Minimisation of the stresses to the crab, is likely to maximise the quality and integrity of the crabs, maintaining the value for sale. Further, there has been a secondary problem of being able to handle the crab through the process of catching, sizing, checking the sex, sorting and right through to sale, without needing to contact the crab, or in particular the sharp claws. It has been long desired a better manner to handle crabs and keep them calm and isolated during the transportation from sea to customer. To do so reduces danger to the people handling the animals, reduces stress on the animals and maximises the number and quality of the product to be sold.

The inventor has, through long and careful experimentation and development, invented a new catcher basket assembly, that enables safer handling of the crab through each stage from catch to customer, through use of confinement. The confining baskets, within a larger basket, are convenient to use and efficient in space with the significant added advantage of minimising damage to the crab and reducing the risk of the need for any contact with the crab during the sorting and handling process. The invention makes the job of sorting and transporting the crab less stressful on the animal as they are protected and confined but also safer for the worker, as each animal can be inspected in a contained and confined manner.

It is anticipated that, as the invention becomes well known it will be adopted as the industry standard for sorting and transporting crabs and other animals, due to the ease and usefulness of the invention.

The following describes a non-limiting example of the invention being used with reference to catching crabs, as a very useful application of the invention. However, it is not intended that the invention be in limited to crabs, other than as stated in the claims. The invention may be applicable for use for many types of creatures. For example, other seafood, or for animals for research purposes, may be used with the catcher basket assembly. The invention may be used with any suitable living organism.

For clarity, any prior art referred to herein, does not constitute an admission that the prior art forms part of the common general knowledge, in Australia or elsewhere.

It is an object of the present invention to provide catcher basket assembly that at least ameliorates one or more of the aforementioned problems of the prior art. It is a further object of the present invention to provide a method of use of a catcher basket assembly that at least ameliorates one or more of the aforementioned problems of the prior art.

DISCLOSURE OF THE INVENTION

Accordingly, the present invention provides a catcher basket assembly, for confining animals, the catcher basket assembly including:
  a main body;
  at least one confining container for containing the animal; and
  at least one directing part in the main body, for assisting to direct the animal from the main body to the confining container,
wherein, the directing part directs an animal towards one or more confining container and the confining container enables the animal to be visually inspected and sorted without the need to make direct contact with the animal.

Preferably, the catcher basket assembly is made substantially of a plastics material. The catcher basket assembly may be made of any suitable material, including plastics, wood, metal or similar. Preferably, the catcher basket assembly is made to enable drainage of liquid from the assembly. Preferably, the catcher basket enables good airflow. Preferably, holes, slots or gaps are incorporated into the catcher basket assembly. Preferably, the holes, slots or gaps ensure good drainage and airflow. Most preferably, there is free air flow and water flow from the catcher basket to keep the animals comfortable during confinement.

Preferably, the confining is to keep separated and safe from other animals. Preferably, the confinement includes to keep from escaping. Preferably, the confinement is of each single animal. Preferably, a plurality of single animals are to be kept confined by the assembly. In other forms of the invention it may be possible to contain pairs or other numbers of animals within a single container. Most preferably, each animal is kept safely contained in an isolated fashion from other animals transported in the catch animal assembly at the same time.

The main body may take any suitable form, convenient to transport the animals from catch to customer. Preferably, the main body is similar in size and shape to a prawn basket or crate of a known form. The dimensions of the main body may be of any suitable size or shape. Preferably, the main body is of a shape that may be stacked. Preferably, a plurality of stackable main bodies are supplied that may be stacked to transport a plurality of animals.

Preferably, the main body is substantially cuboid in shape. Preferably, the main body is substantially cuboid in shape, open to the top to create a stackable "crate" shape.

Preferably, the main body includes two pairs of opposed sides about a base. Preferably, one pair of opposed sides is longer than the other. Preferably, one or more handle is included. Preferably, a pair of handles are included on each opposed side. The handle may be in the form of a cut-out to create a hand-hold. The handle may take any suitable form. There may be variation to the particular form of the main body to suit the particular animal and application of the invention. A plastic crate type form is useful for seafood as it enables excess water and waste to readily flow away, and air to easily circulate. Additional water may be applied during transportation to keep the animals cool or moist and flows easily through the plastic crate from.

Preferably, the main body is made substantially of a plastics material. The main body could be made of any suitable material including wood or metal. Preferably, the main body is made of a lightweight waterproof material. Preferably, slots or holes in the walls or floor maintain good drainage and airflow. Use of a sturdy plastics material is particular useful to enable the apparatus to be used many times over.

Preferably, the confining containers are made substantially of a suitable plastics material. The confining containers may be made of any suitable material including wood or metal or combination of materials. Preferably, the confining containers are made of a lightweight waterproof material. Preferably, the confining containers are substantially cuboid in shape. Preferably, the confining container includes a pair or pairs of opposed sides about a base and with atop. Preferably, the confining container includes two pairs of opposed sides about a base with a top, and a pair of ends formed by one pair of the opposed sides. The opposed sides may be the same or different lengths to one another. Other shapes and forms may be used instead. Preferably, the short sides or ends are the short sides or ends to the long sides of the confining containers. Preferably, the ends may be at the termination of the long sides. Preferably, at least one end of the confining container includes a door. More than one end may include a door. Preferably, the door is movable between a substantially open state in which the animal may pass into the confining container and substantially closed state whereby the door substantially prevents the animal from leaving the confining container. The door may take any suitable form. Preferably, the door is a trapdoor. Preferably, the door slides up and down between a substantially open and a substantially closed position. Preferably, the door slides between a substantially open and a substantially closed position in a slot whereby in the substantially open position the animal may enter the confining container and in the substantially closed position the animal is substantially confined.

Preferably, any one or more of the sides (including ends), base or top of the confining container includes small apertures. The small apertures may enable drainage and airflow, without allowing escape of the animal. The container may be perforated throughout to enable good airflow for the animal while allowing water or other waste to pass out of the container.

Preferably, visual inspection of the animal is enabled through the apertures. The visual inspection may be to determine if the animal meets the local authority requirements to keep the animal. The visual inspection may be to determine the sex of the animal. The visual inspection may be to determine the size of the animal. The visual inspection may be to determine any suitable features or characteristics of the animal to be considered. Preferably, the visual inspection may be carried out by holding the container in the hand of the person without risk of contact with the animal. Preferably, the visual inspection may be chose from the following group: to determine if the animal meets the local authority requirements to keep the animal; to determine the sex of the animal; to determine the size of the animal; or to determine any suitable features or characteristics of the animal to be considered. Preferably, use of the container enables the animal to be sorted. Most preferably, the contained animal may be handled and inspected safely through use of the confining container. Most preferably, the visual inspection is not hindered by use of the confining container as the confining container has many apertures, through which, on moving the animal within the container the animal can be seen comfortably to make the necessary assessments such as to the size and sex. Most preferably, the confining container allows close visual inspection of the animal. Most preferably, the confining container enables close visual inspection of the animal without the handler needing to handle the animal directly.

Preferably, each container includes a handle so it may be picked up without other contact with the container or the animal. Preferably, the handle is a recessed handle which does not interfere with the stacking of the containers. Any suitable means of handle may be used instead. Or the handle may be omitted in other forms of the invention.

Preferably, the containing of the animal is to keep the animal confined and able to be sorted without contact with the person handling the container. That is to protect the person from the risk of injury through a crab claw pinching for example. The nature of the protection will differ animal to animal, some may bite, some sting, some have physical spikes, spines or claws. Overall, the invention enables protection of the hand of the person while still being able to closely inspect the animal.

Preferably, a plurality of confining containers are included. Preferably, each container can contain an animal and after capture these containers may be stacked within the main body. Preferably, a plurality of confining containers may be stacked within the main body for transportation of short term storage. Stacking of a number of confining containers within the main body, which is itself stackable enables efficient transportation.

Preferably, the confining containers include stack means to maintain a plurality of confining containers in a stacked state during transportation. Preferably, one or more "feet" is included that cooperated with a corresponding part of another confining container to assist to maintain the confining containers in a stacked state. Any suitable two part reciprocating stacking may be used instead. Or the containers may simply rest one on another. Most preferably, each confining container includes stacking means on the top and bottom to reciprocally assist stacking. Most preferably, a plurality of stacking arrangements may be possible to safely carry confined animals through use of the apparatus.

Preferably, the main body includes one or more directing part. The directing part may take any suitable form. Preferably, the directing part includes a divider. Preferably, the divider is a substantially rectangular divider. Preferably, the divider runs across the body to divide it into sections. In other forms of the invention the divider may divide the main body in any suitable manner according to the particular configuration of the confining containers to be used therewith. Preferably, the divider prevents the animal from crossing from one part of the main body to another. In use, a confining container will be the only option for the animal if it moves from one section of the main body to another. Preferably, the divider divides the main body and a confining container is placed so as to be substantially open. Preferably, in this way the animal is prevented from entering another part of the body, other than by entering a confining container. Therefore, they only open confining container is the one where it is desired to confine the animal. The divider means that the animal placed in the main body at a suitable position is directed towards the substantially open door of the container. Preferably, there are no other directions or containers available to the animal so that the animal is directed to enter the desired substantially open confining container through the substantially open door. Once the animal has been directed through the substantially open door the door may be closed and the animal is confined and separated from other animals. In other forms of the invention the directing part may form part of the confining container instead. The described form of the invention, as described below is particular useful, however, and useful as the confined animals may readily be directed and then confined and separately, removed in the confining container, while other animals may be sorted through the remainder main body and divider.

Preferably, two dividers are included, one to divide the main body in one direction and one to divide the main body in another direction. Preferably, one divider is included to divide a top section of the main body in two, but is open at a lower section enabling the animal to travel to the lower part of the main body. In use a confining container will be in this lower part of the main body, substantially open, ready to receive and trap the animal one the door is closed. A second divider is included only at the lower level, running perpendicular to the first divider to direct the animal into one or other side of the available part of the main body. As animals are directed and confined one by one, different parts of the dividers may be used.

In other forms of the invention the main body and confining containers may be somewhat integral. The door and dividers, may all form part of the main body and or confining containers to assist to direct the animal to the confining container in another form of the invention.

Preferably, each confining container can contain a single animal. Preferably, the assembly is filled with containers, stacked for transportation and maintained safe until delivered to the customer.

Accordingly, the present invention provides, in a variant, a catcher basket assembly, for confining crabs, the catcher basket assembly including:
  a main body;
  a plurality of confining containers for containing individual crabs each with a door moveable between a closed and open state;
  a first divider across the main body leaving an opening between the base and the lower part of the divider, for assisting to direct the animal from the main body to the confining container;
  a second divider running substantially perpendicular to the first, across the main body from an end to the first divider, between the base and the lower part of the divider for assisting to direct the animal from the main body to the confining container,
wherein, the dividers direct an animal towards one or more substantially open confining container, whereby the door can be closed to confine the crab therein, and the confining container enables the crab to be visually inspected and sorted without the need to make direct contact with the animal.

The invention also provides a method of use of a catcher basket assembly for confining an animal, the catcher basket assembly including a main body, at least one confining container, and at least on directing part, the method including the steps:
  a) Placing a container with an opening in the main body at a suitable position whereby the directing part will direct the animal towards the opening in the container;
  b) Putting an animal in the main body; and
  c) Closing the opening of the container once the animal is within the container.

The method may include the further step of:
  d) Visually inspecting the animal, once contained.

The method may include the further step of:
  e) Sorting the animals by size, sex or other characteristics, once contained.

The method may include the further step of:
  f) Stacking a plurality of containers in the main body for transportation or short term storage.

Most preferably, the method is repeated for all the animals for sorting before transportation and sale. The catcher basket assembly of the method, is preferably the catcher basket assembly of the invention in any of its forms or variants.

INDUSTRIAL APPLICABILITY

The catcher basket assembly may be manufactured industrially, and supplied to wholesalers, retailers or customers directly for purchase.

BRIEF DESCRIPTION OF THE DRAWINGS

The invention will now be described in connection with a non-limiting preferred embodiment, with reference to the accompanying drawings, in which.

DETAILED DESCRIPTION OF THE INVENTION INCLUDING A BEST MODE

Figure 1:
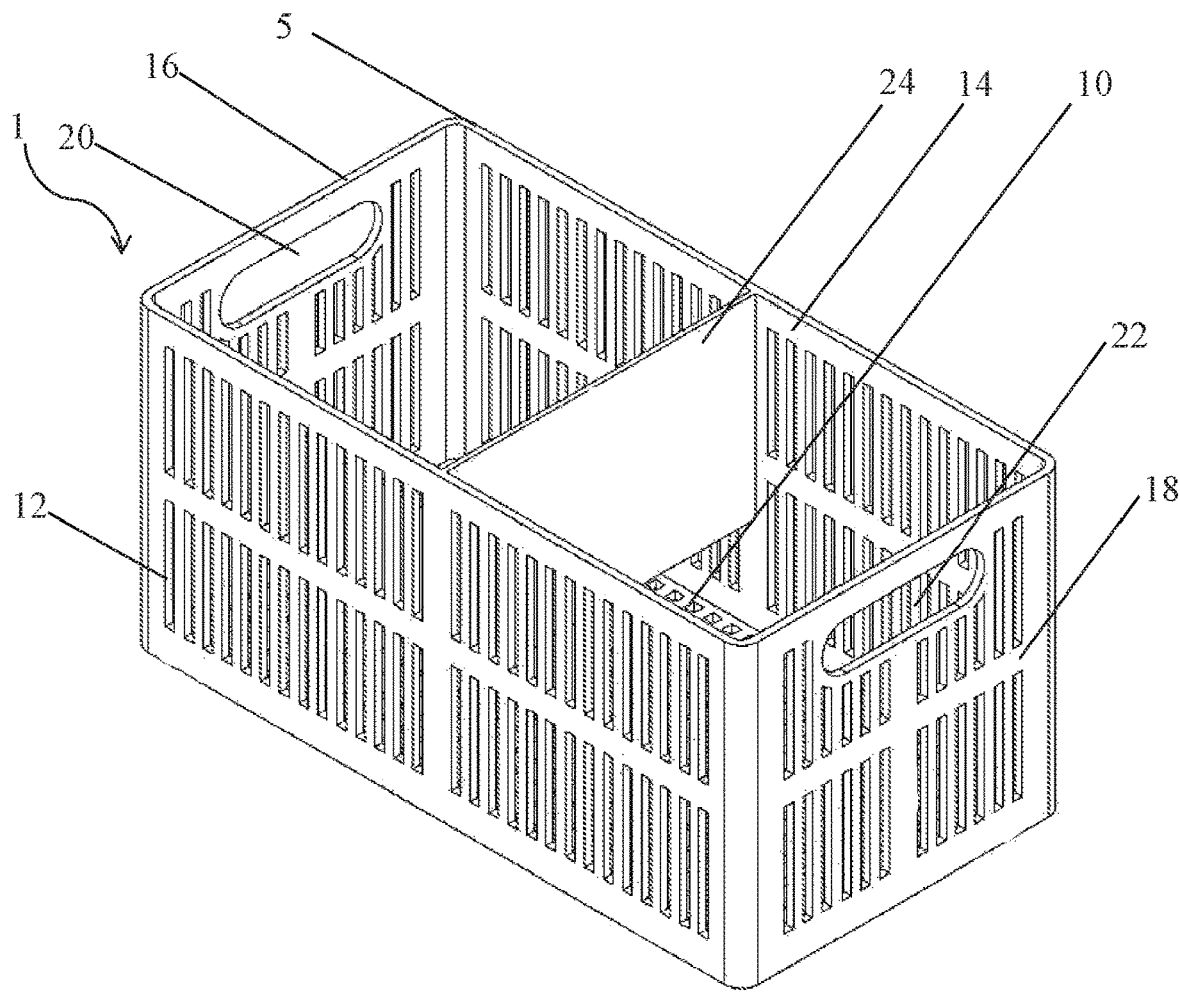
FIG. 1 is a perspective view from above of a catcher basket assembly with the boxes removed, according to a preferred embodiment of the invention.
Figure 2:
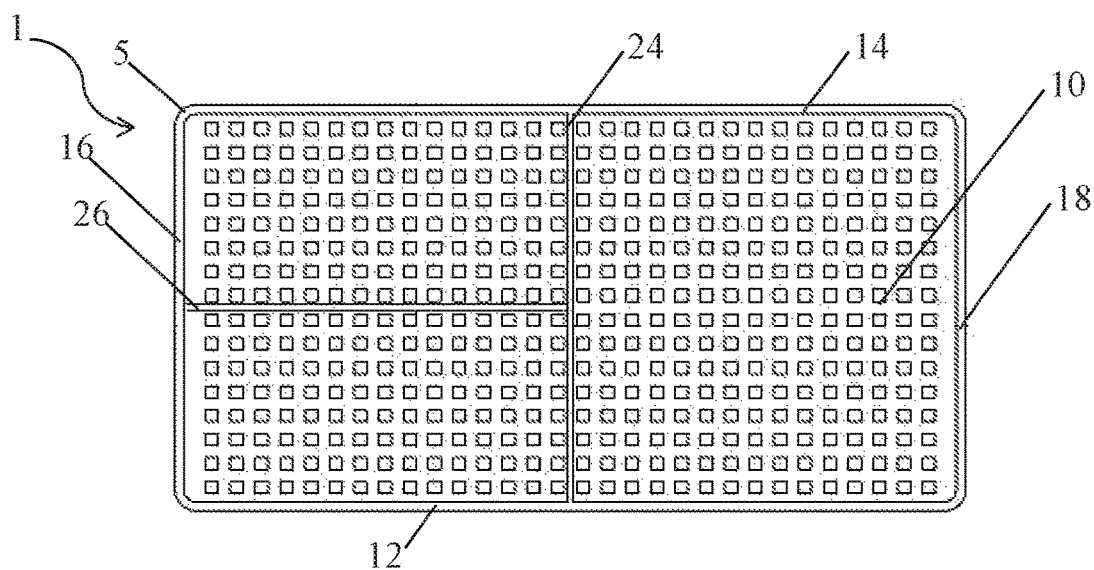
FIG. 2 is a plan view from above of the catcher basket assembly of FIG. 1.
Figure 3:
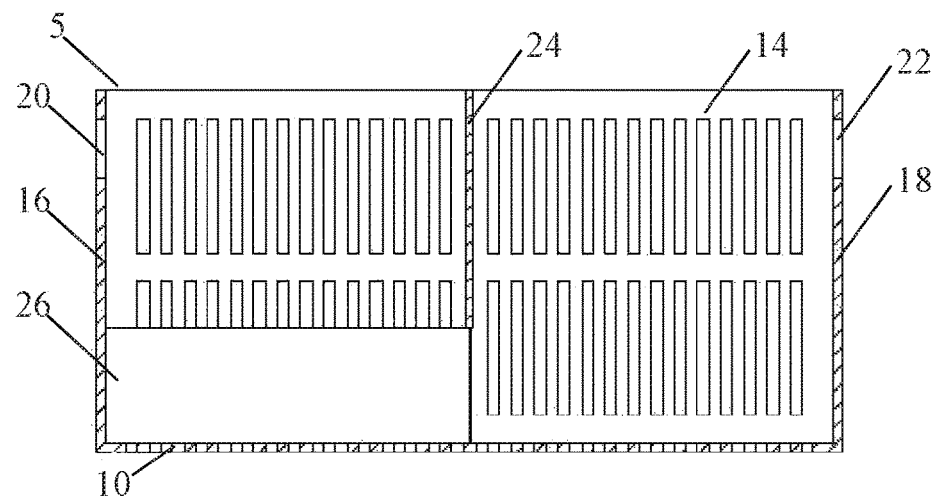
FIG. 3 is a longitudinal cross-sectional view of the catcher basket assembly of FIGS. 1 and 2.
Figure 4:
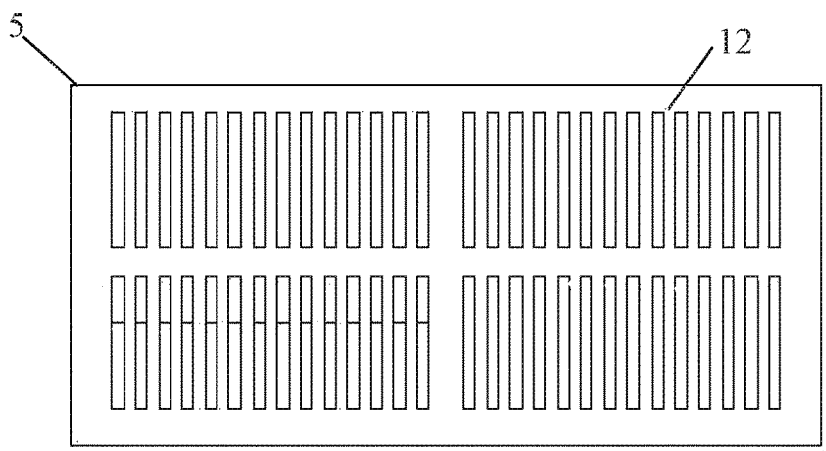
FIG. 4 is a side view of the catcher basket assembly of FIGS. 1 to 3.
Figure 5:
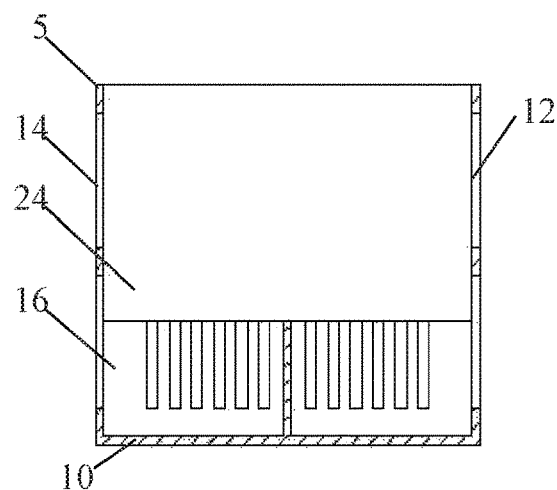
FIG. 5 is a cross-sectional view of the catcher basket assembly of FIGS. 1 to 4.
Figure 6:
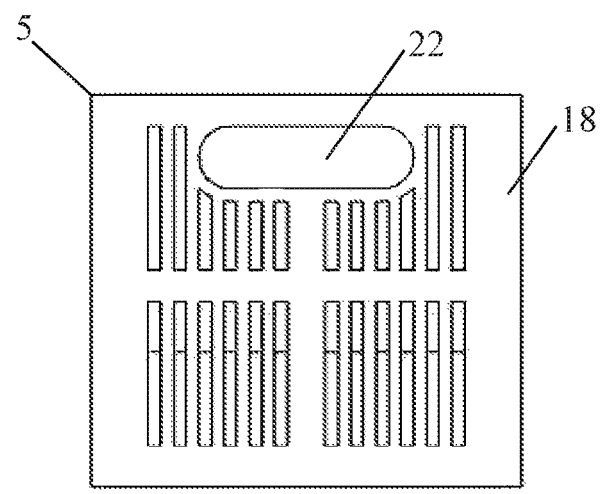
FIG. 6 is an end view of the catcher basket assembly of FIGS. 1 to 5.
Figure 7:
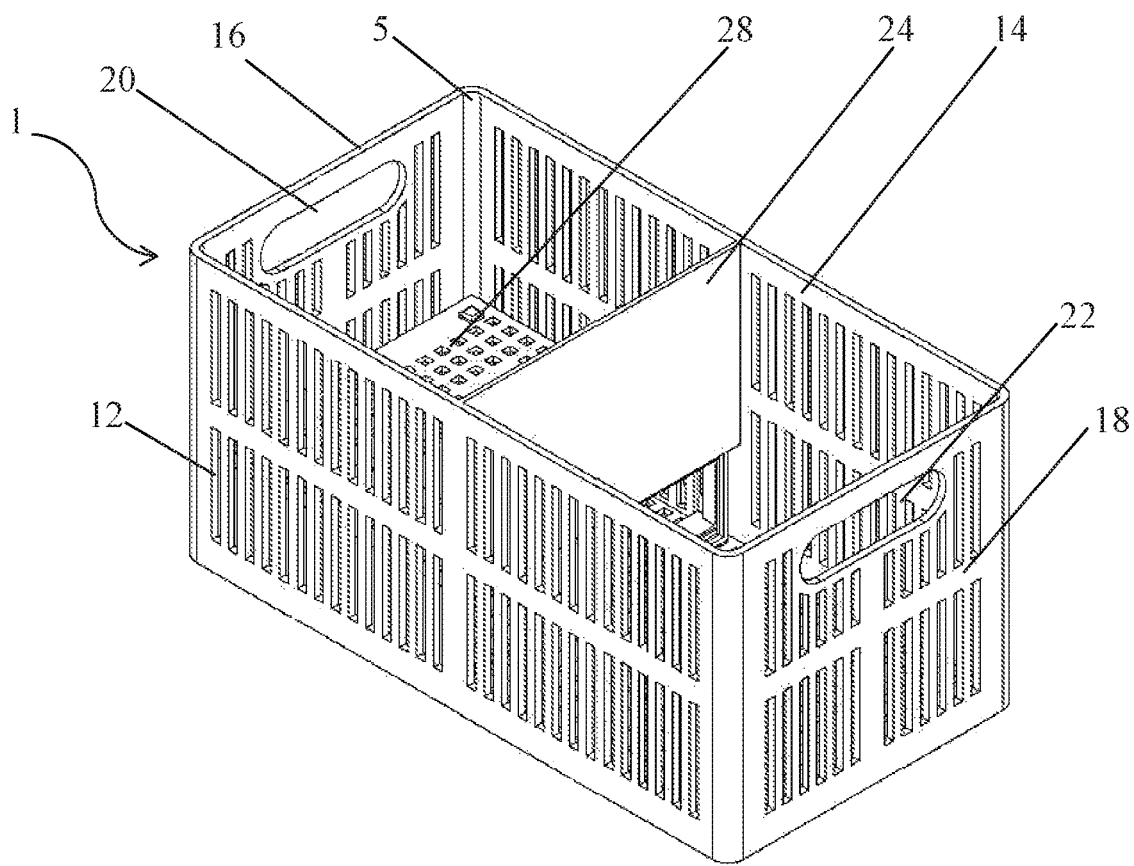
FIG. 7 is a perspective view of the catcher basket assembly of FIGS. 1 to 6, with a box installed.
Figure 8:
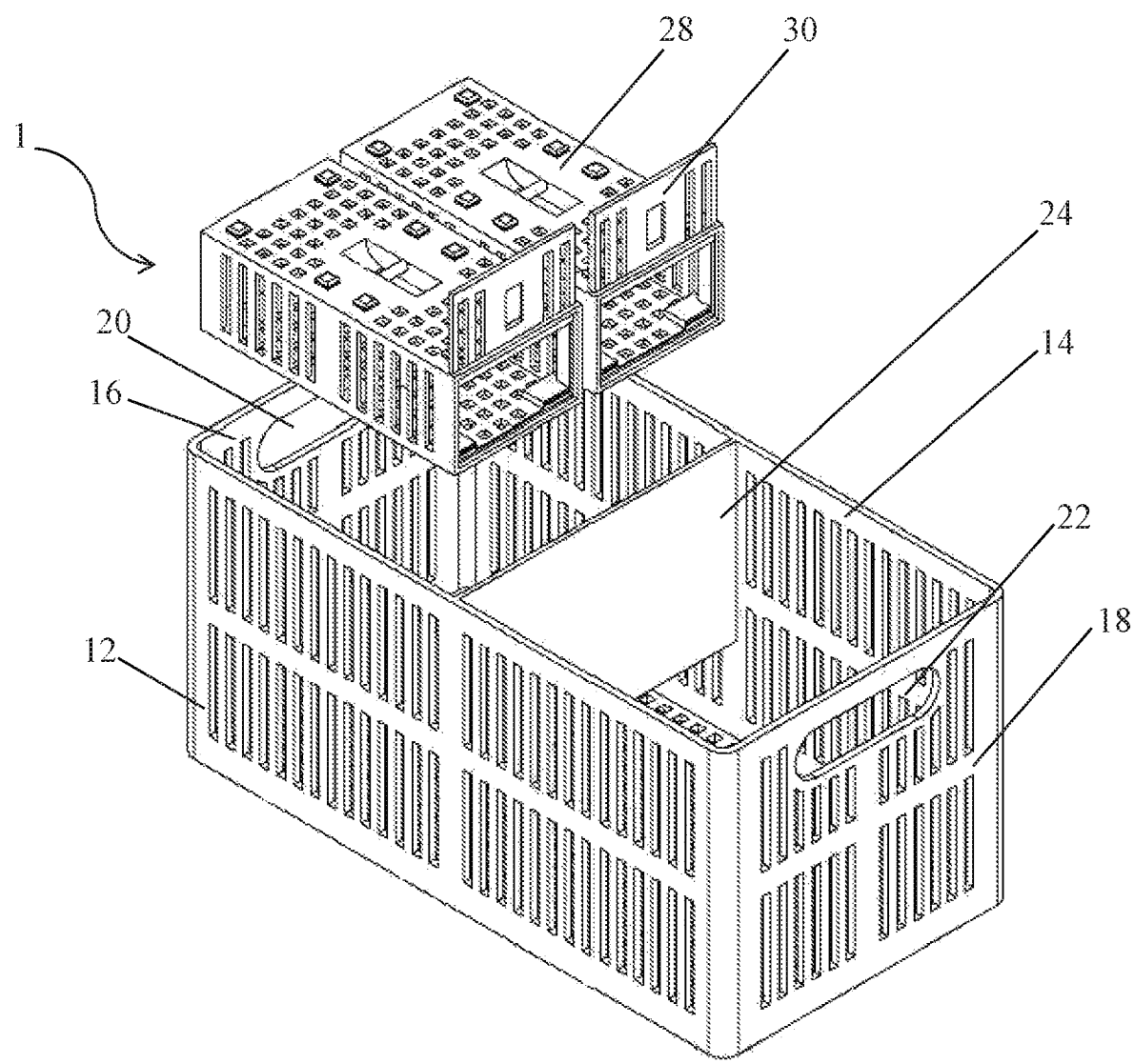
FIG. 8 is a perspective view of the catcher basket assembly of FIGS. 1 to 7, showing how two boxes are installed with their doors open.
Figure 9:
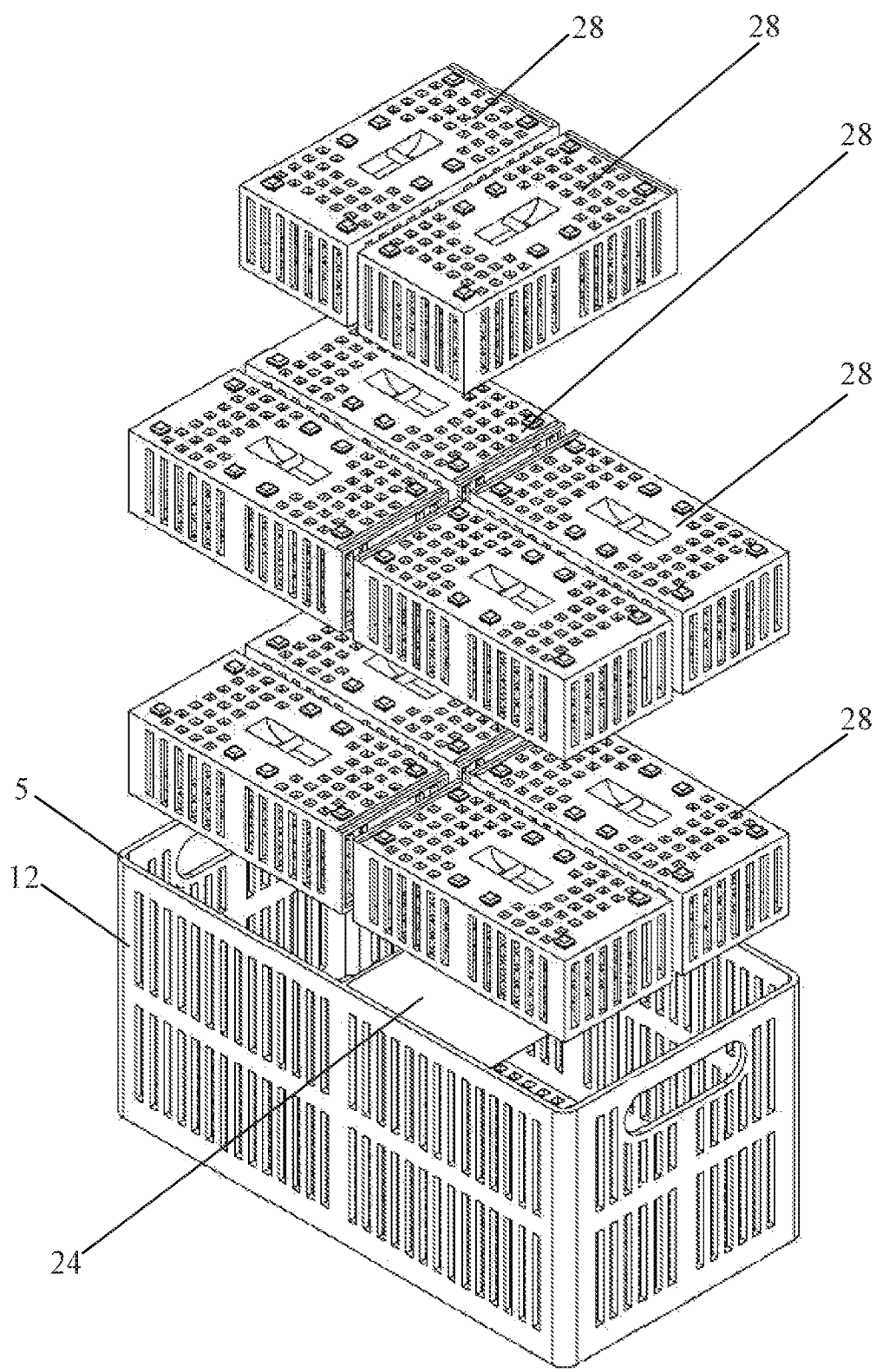
FIG. 9 is an exploded perspective view of the catcher basket assembly of FIGS. 1 to 8, showing the stacking arrangement of the boxes.
Figure 10:
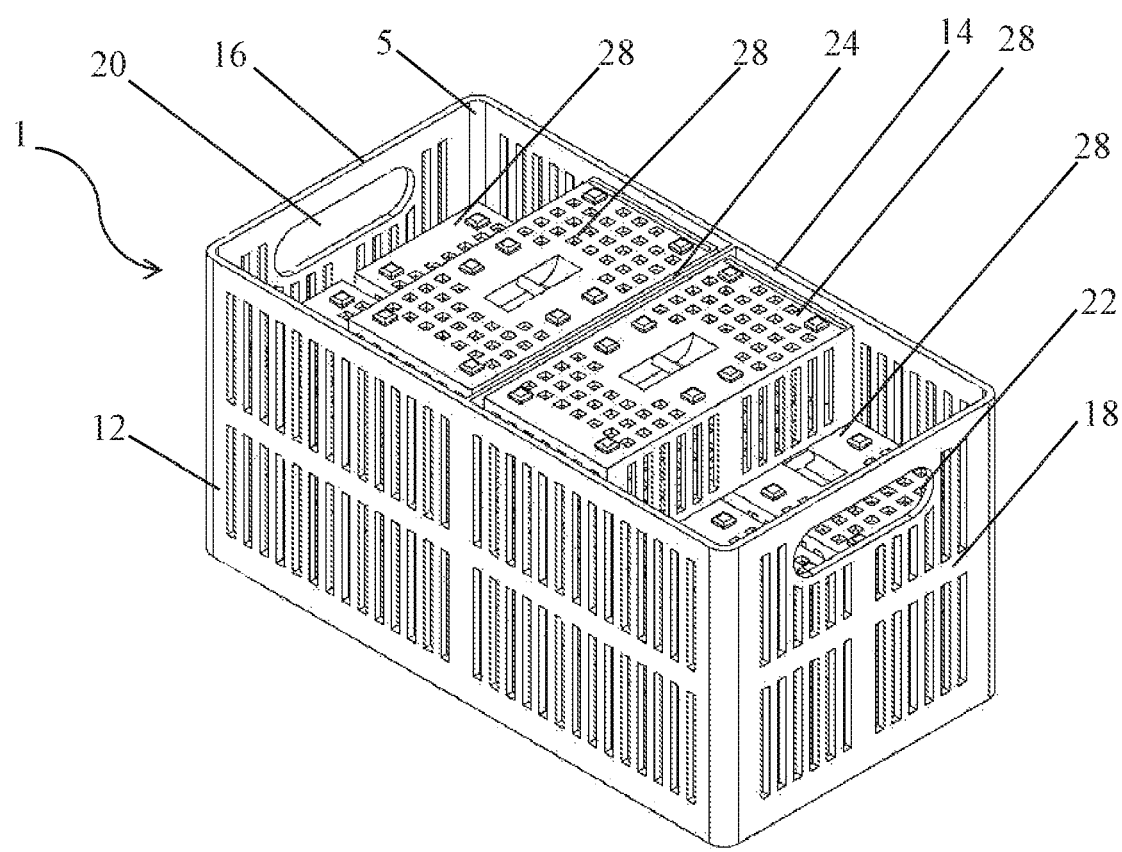
FIG. 10 is a perspective view of the catcher basket assembly of FIGS. 1 to 9, showing the stacked boxes.
Figure 11:
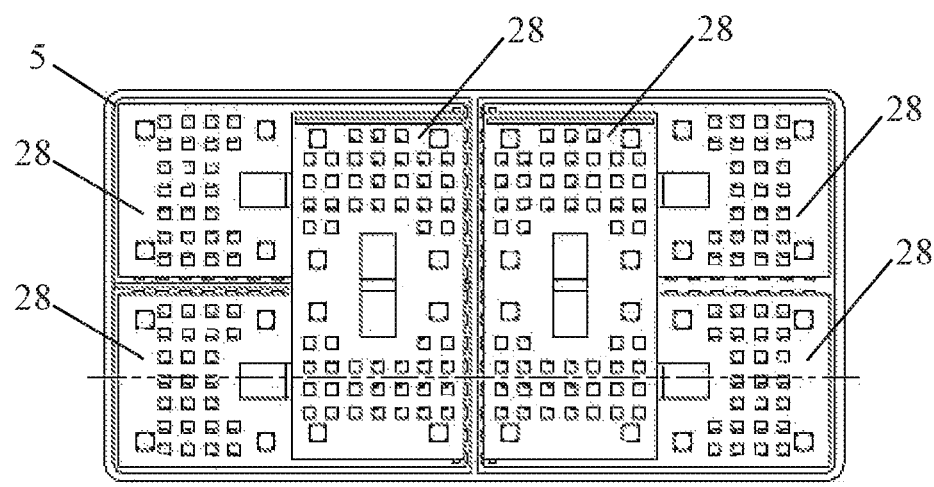
FIG. 11 is a view from above of the catcher basket assembly of FIG. 10, stacked with boxes.
Figure 12:
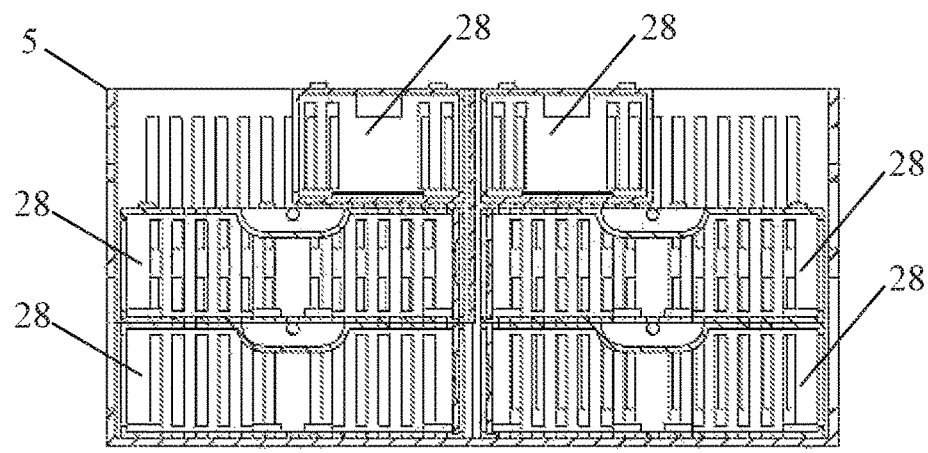
FIG. 12 is a longitudinal cross-sectional view of the catcher basket assembly of FIGS. 10 and 11.
Figure 13:
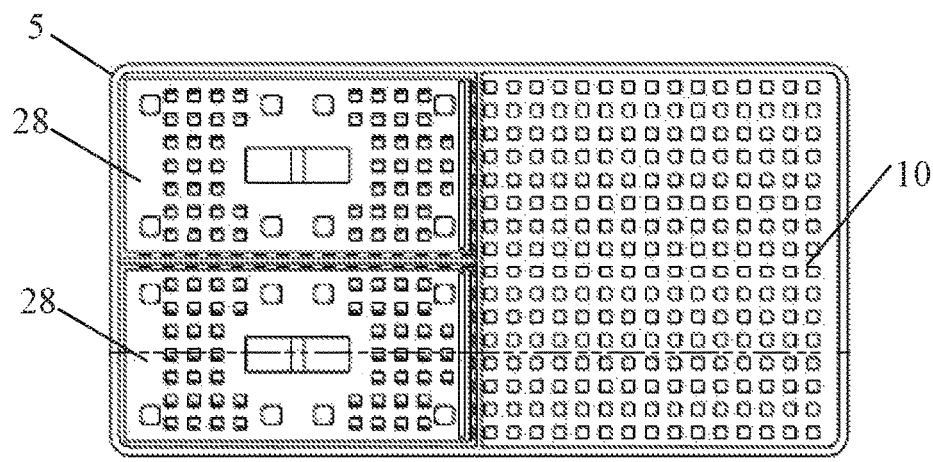
FIG. 13 is a plan view from above of the catcher basket assembly of FIGS. 10 to 12.
Figure 14:
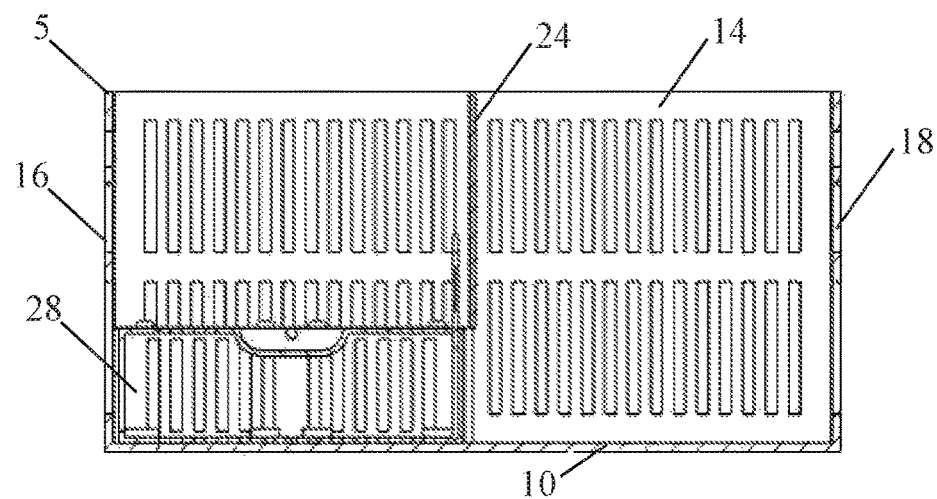
FIG. 14 is a longitudinal cross-sectional view from above of the catcher basket assembly of FIG. 7.
Figure 15:
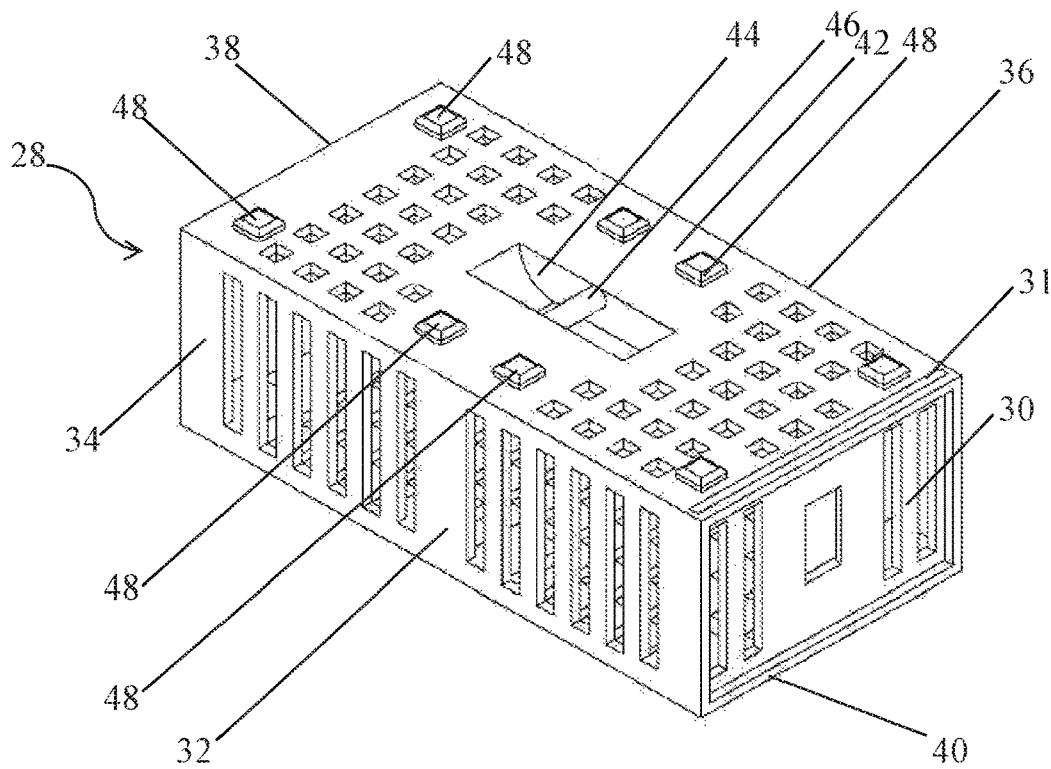
FIG. 15 is a perspective view of a box of FIGS. 7 to 13.

Referring to FIGS. 1 to 19, a preferred embodiment of the invention will be described, where catcher basket assembly 1, has basket 5 with base 10, opposed long sides 12 and 14 and opposed short sides 16 and 18. Catcher basket assembly 1 is in the form of a rectangular based crate or basket which is useful to stack and transport, either on a boat or on land. Handles 20 and 22 are included in short sides 16 and 18 in the form of cut-outs into which a person may place their hand. Other forms of handle could be used too, but basket 5 is designed to be a simple, stackable container, similar to crates used in the industry at present. Each of sides 12, 14, 16, and 18 are shown made of a strong plastics material as is common in the art. Metal or other materials could be used instead. Slots are included in each of the sides 12, 14, 16, and 18 to reduce the overall weight and to enable water to escape, and air to flow freely. Base 10 similarly, has a pattern of holes to enable liquid or waste to drain away and air to flow. Other forms of holes, slots or drainage may be used instead.

As described so far, basket 5 is somewhat similar to a crate or basket used in the industry for display or transport of seafood. However dividers 24 and 26 are included, which are important to enable the safe directing and handling of the crabs through the whole process from catching, through sorting and transportation for sale. Dividers 24 and 26 are both generally rectangular dividers made of a plastics material, and can be seen in particular in FIGS. 3, 5 and 7. Divider 24 divides basket 5 into 2 generally equal halves by spanning from long side 14 to long side 16. Divider 24 is sized to block from the upper edge of basket 5 downwards but is open across the base. The gap between the base and the lowermost edge of divider 24 is sized so that the open door of a box 28 can fit underneath.

Divider 26 runs from divider 24 to end 16 such that the base is divided into two parts, each suitable to fit a box 28. Use of dividers 24 and 26 guide crabs put in basket 5 towards a box 28. A crab cannot simply climb over or out or go elsewhere, the crab is directed to go under divider 24 and either left or right, due to divider 26.

Figure 16:
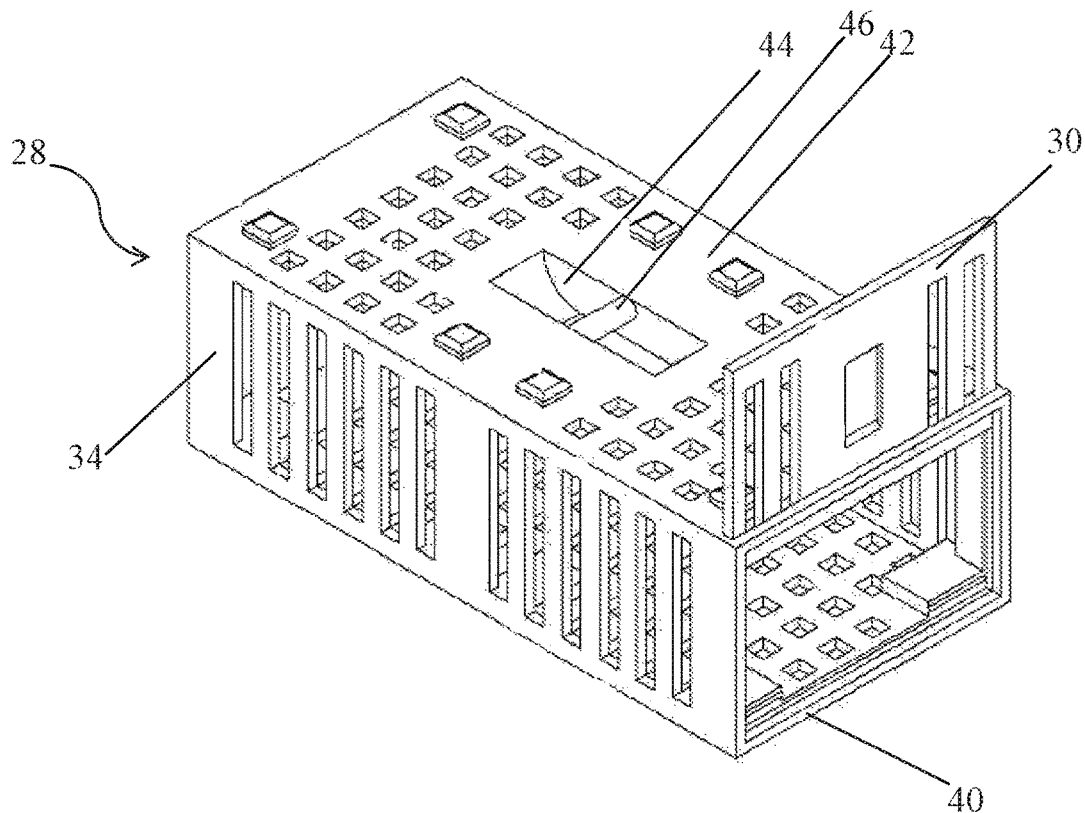
FIG. 16 is a perspective view of the box of FIG. 15 with the door open.
Figure 17:
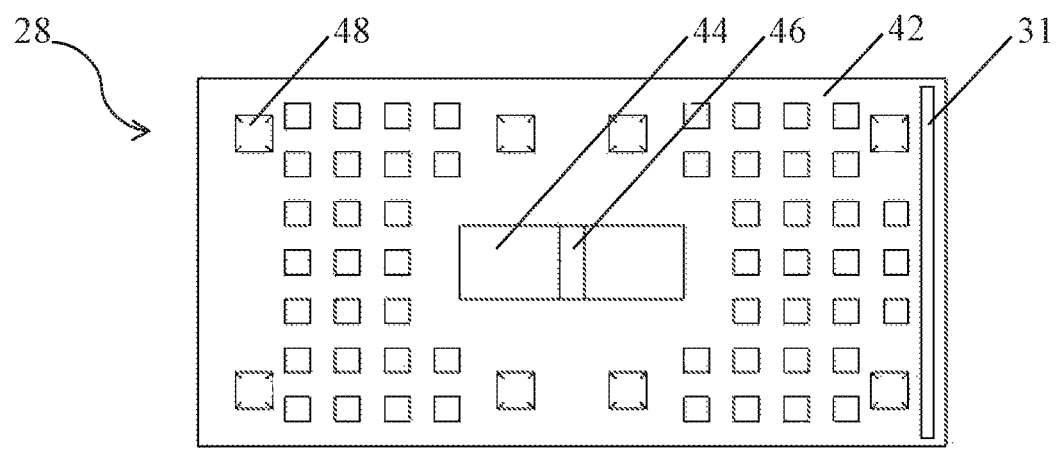
FIG. 17 is a plan view from above of the box of FIG. 15 or 16.
Figure 18:
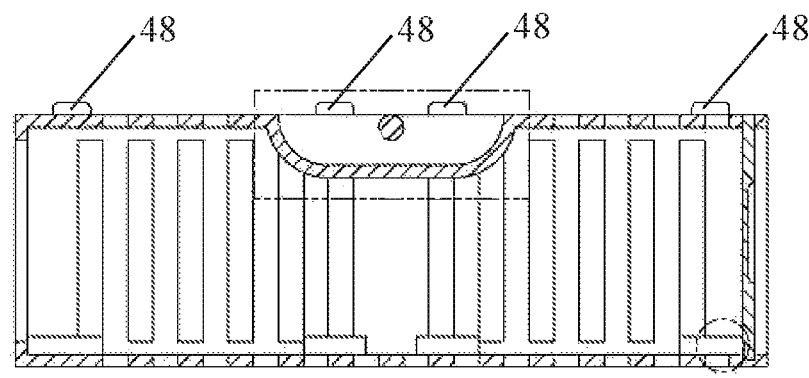
FIG. 18 is a longitudinal cross-section of the box of FIGS. 15 to 17.
Figure 19:
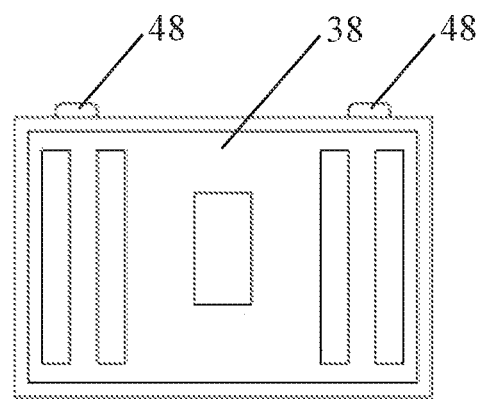
FIG. 19 is an end view of the box of FIGS. 15 to 18.

One or two boxes 28 can be placed on base 10 with trapdoors 30 raised out of slots 31, refer FIG. 16 in particular, and open so that a crab placed or tipped on base 5 can find their way inside. One trapdoor 30 at a time may be opened. Each box 28 has base 32 surrounded by opposed long sides 34 and 36 and short sides or ends 38 and 40. Short side or end 40 contains trapdoor 30 in slot 31. Top 42 completes box 28, to be able to contain an animal when trapdoor 30 is closed or release an animal when trap door 30 is open. The particular form of trapdoor 30 is a simple slide up and down mechanism which is held open by resting on slight projections, which are easily pushed passed to close trapdoor 30. The form of trapdoor 30 is convenient as it is very easily used and does not have complex moving parts that could become dirty or stop working. The simple sliding mechanism works very well for an item, as described being used in the seafood industry.

Handle recess 44 for handle 46 enables a person to easily hook a hand or fingers around handle 46 and carry box 28. Other forms or handle may be used instead but the recess handle is useful as it does not interfere with the stackable cuboid shape of box 28. Box 28 is illustrated with a pattern of holes throughout the base 32, top 42 and sides 34, 36, 38 and 40. Each of these is formed of a plastics material and the holes enable the confined animal to breath and water drain away. The holes and slots throughout basket 5 and boxes 28 assist for flow and drainage of water and airflow which is all beneficial for the health of the crabs.

The crabs (not shown) naturally move to crevices and protection and so find their way from the open body of basket 5 into box 28, looking for a cave or crevice to hide in, but finding an empty container instead. In addition basket 5 can be gently tipped to encourage movement of the crab into box 28. The apparatus is very simple to use in this way and does not interfere with the health of the crab, important for the crab but also the ultimate sale price. Once in box 28, trapdoor 30 can be released through a simple catch mechanism held up until pushed past the resistance to confine the crab. Once the crab is in box 28 it can be lifted up by the person safely, without the need to handle the crab itself. The crab is carefully confined, and safe from damage, but also the sharp claws are kept away from being able to nip a person. The crab can be measured and sexed within box 28 to see if the local requirements are met so that the crab can be kept. Very close inspection of the crab may be made safely as the crab is contained within the box. If the animal is too small or a female where females need to be returned, the crab can easily be released back into the water through use of trapdoor 30. For example, the crab can be quickly checked and sorted and if not suitable for sale returned to the water by tipping out of the container thorough an open trapdoor 30. The whole process is much less stressful for the crab, as it is quick and does not required a fight between the crab and handler. The handler also benefits and his or her hands are protected but the crab can be easily seen and sorted, giving confidence to perform the job efficiently.

Two or more boxes 28 can be placed on base 5 at a time and crabs will quickly find their way in, to the cave or crevice like boxes, as directed. In use it is quite amazing, that the natural desire of the crabs to hide means they sort and separate themselves into the confining containers once in the clever inventive apparatus. Once in box 28 each crab can be contained and removed by handling box 28. The process can be repeated for multiple boxes until all the crabs are safely confined. Many boxes 28 can each be filled with a single animal and efficiently stacked for transport and sale. Boxes 28 are adapted to be stacked into basket 5 for transport as can be seen in particular in FIG. 9. 10 boxes 28 are shown stacked inside to transport the crabs as is convenient. Other configurations may be used instead, to safely stack the crabs, each confined in its own box 28. Other arrangements can also be used as the person skilled in the art would find useful to the particular application of the invention.

Boxes 28 have improved stackability through use of raised square feet 48, which may rest in reciprocating recesses in some forms of the invention. Use of the feet prevents sliding so that boxes 28 can be maintained within basket 5. In this manner, the multiple stacked boxes advantageously can be transported distances safely, with the crabs contained. Both the main body and individual boxes may be stackable and include means to assist this stacking as would be understood by a person skilled in the art.

In use, a commercial fisher may bring up a trap and have three mud crabs. These are tipped into basket 5 of catcher basket assembly 1. One at a time a mud crab may enter open trapdoor 30 and the fisher can release trapdoor 30 so it slides in slot 31 to close. At this point box 28 containing the mud crab may be removed. The size, condition and sex of the crab can be assessed visually through the open sides of box 28. If the crab is undersize trapdoor 31 is opened and the mud crab returned quickly and safely to the sea. If the mud crab is suitable to be kept it remains safe and comfortable in box 28. Another box 28 has in the meantime replaced the first and both boxes on base 10 now contain the remaining two crabs. Each can again be assessed and kept and the boxes put aside. The process may be repeated for the next crab pot, two crabs this time, tipped into assembly 1 and make their way into new open boxes 28. The process is repeated for all the crabs and once 10 collected these can be stacked in basket 5 for safe transportation.

A fisher will use several sets of apparatus at the same time to speed up the capture, confinement and sorting of crabs. Once all sorted these can be stacked into basket 5 for transportation. Due to the safe confinement and gentle handling the process is easier on both the fisher and the crab. Good water and airflow makes it easier to keep the crabs comfortable for transportation to the port for direct sale or for further transportation to market or a customer.

The whole process is more efficient, safer and better for the health and condition of the crab, most beneficial. The inventor has through a simple to use but sophisticated system overcome some significant problems for crab fishers. It is likely that the invention will be welcomed in the industry once made available.

It is envisaged that other small animals either for research purposes, agriculture or in the foods industry may also be confined, handled and sorted using the assembly.

It will be apparent to a person skilled in the art that changes may be made to the embodiment disclosed herein without departing from the spirit and scope of the invention in its various aspects.

| REFERENCE SIGNS LIST: | |
|---|---|
| 1 | Catcher basket assembly |
| 5 | Basket |
| 10 | Base |
| 12 | $1^{st}$ long side |
| 14 | $2^{nd}$ long side |
| 16 | $1^{st}$ short side |
| 18 | $2^{nd}$ short side |
| 20 | Handle of 16 |
| 22 | Handle of 18 |
| 24 | Divider (crossways) |
| 26 | Divider (lengthways) |
| 28 | Boxes |
| 30 | Trap door of 28 |
| 31 | Slot for trap door |
| 32 | Base of 28 |
| 34 | $1^{st}$ long side of 28 |
| 36 | $2^{nd}$ long side of 28 |
| 38 | $1^{st}$ short side of 28 |
| 40 | $2^{nd}$ short side of 28 |
| 42 | Top of 28 |
| 44 | Handle recess |
| 46 | Handle |
| 48 | Feet |
| 50 | |
| 52 | |
| 54 | |
| 56 | |
| 58 | |
| 60 | |
| 62 | |
| 64 | |
| 66 | |
| 68 | |
| 70 | |
| 72 | |
| 74 | |

The invention claimed is:

1. A catcher basket assembly, for confining animals, the catcher basket assembly comprising:
   a main body;
   at least one confining container for containing the animal; and
   at least one directing part in the main body, for assisting to direct the animal from the main body to the at least one confining container, the directing part including at least one divider,
   wherein, the directing part and divider directs an animal towards the at least one confining container and the at least one confining container enables the animal to be visually inspected and sorted without the need to make direct contact with the animal, and
   wherein the at least one confining container includes a door movable between a substantially open state which permits the animal to pass into the confining container and a substantially closed state whereby the door substantially prevents the animal from leaving the confining container.

2. The catcher basket assembly of claim 1, wherein holes, slots or gaps are incorporated into the catcher basket assembly to enable free air flow and water flow to keep the animals comfortable during confinement and to enable visual inspection without the handler needing to handle the animal directly.

3. The catcher basket assembly of claim 2, wherein the visual inspection is chosen from the following group: to determine if the animal meets the local authority requirements to keep the animal; to determine the sex of the animal; to determine the size of the animal; or to determine any suitable features or characteristics of the animal to be considered.

4. The catcher basket assembly of claim 1, wherein the confinement is of a plurality of animals such that each individual animal is confined in a single confinement container.

5. The catcher basket assembly of claim 1, wherein the main body is of a stackable shape and wherein a plurality of stackable main bodies are supplied and the plurality of stackable main bodies are stacked to transport a plurality of animals.

6. The catcher basket assembly of claim 1, wherein the at least one confining container includes a pair or pairs of opposed sides about a base and with a top, ends being formed in one pair of opposed sides and at least one end of the confining container includes a door.

7. The catcher basket assembly of claim 1 wherein the door is a trapdoor.

8. The catcher basket assembly of claim 1, wherein the door slides in a slot between a substantially open position wherein the animal is substantially confined.

9. The catcher basket assembly of claim 1, wherein a plurality of confining containers are included and each confining container is stacked within the main body once the confining container contains a captured animal.

10. The catcher basket assembly of claim 1, wherein the at least one divider is a substantially rectangular divider.

11. The catcher basket assembly of claim 1, wherein the at least one divider runs across the body to divide the body into two or more sections.

12. The catcher basket assembly of claim 11, wherein an animal moving from one section of the main body to another must enter one of the at least one confining containers.

13. The catcher basket assembly of claim 1, wherein the divider divides the main body and a confining container is placed so as to be substantially open and in this way the animal is prevented from entering another part of the body, other than the confining container.

14. The catcher basket assembly of claim 1, wherein the animal is directed by the divider to enter the desired confining container through a substantially open door.

15. The catcher basket assembly of claim 1, wherein two dividers are included, one to divide the main body in one direction and one to divide the main body in another direction.

16. The catcher basket assembly of claim 1, wherein one divider is included to divide a top section of the main body in two, but is open at a lower section enabling the animal to travel to the lower part of the main body.

17. A catcher basket assembly for confining crabs, the catcher basket assembly comprising:
- a main body;
- a plurality of confining containers for containing individual crabs each confining container having a door moveable between a closed and open state;
- a first divider across the main body leaving an opening between the base and the lower part of the divider, for assisting to direct the animal from the main body to the confining container; and
- a second divider running substantially perpendicular to the first, across the main body from an end to the first divider, between the base and the lower part of the divider for assisting to direct the crab from the main body to the confining container,
- wherein, the dividers direct a crab towards one or more substantially open confining containers, whereby in the closed state the door confines the crab therein, and the confining container enables the crab to be visually inspected and sorted without the need to make direct contact with the crab.

18. A method of use of a catcher basket assembly for confining an animal, the method comprising the steps:

a) Providing a catcher basket assembly comprising:
  i. a main body;
  ii. at least one confining container for containing the animal; and
  iii. at least one directing part in the main body, for assisting to direct the animal from the main body to the at least one confining container, the directing part including at least one divider,
  wherein, the directing part and divider directs an animal towards the at least one confining container and the at least one confining container enables the animal to be visually inspected and sorted without the need to make direct contact with the animal, and
  wherein the at least one confining container includes a door movable between a substantially open state which permits the animal to pass into the confining container and a substantially closed state whereby the door substantially prevents the animal from leaving the confining container;
b) Putting an animal in the main body; and
c) Closing the door of the confining container once the animal is within the confining container.

19. The method of claim 18 further comprising at least one step selected from the group: visually inspecting the animal, once contained; sorting the animals by size, sex or other characteristics, once contained; or stacking a plurality of confining containers in the main body for transportation or short term storage.

* * * * *